United States Patent
Pedersen

(10) Patent No.: US 9,590,626 B1
(45) Date of Patent: **\*Mar. 7, 2017**

(54) PHYSICALLY UNCLONABLE FUNCTIONS WITH ENHANCED MARGIN TESTING

(71) Applicant: Altera Corporation, San Jose, CA (US)

(72) Inventor: Bruce B. Pedersen, Sunnyvale, CA (US)

(73) Assignee: Altera Corporation, San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/006,590

(22) Filed: Jan. 26, 2016

Related U.S. Application Data

(63) Continuation of application No. 14/620,495, filed on Feb. 12, 2015, now Pat. No. 9,279,850.

(60) Provisional application No. 61/940,076, filed on Feb. 14, 2014.

(51) Int. Cl.
*H03K 19/00* (2006.01)
*H03K 19/003* (2006.01)
*G01R 27/26* (2006.01)

(52) U.S. Cl.
CPC ....... *H03K 19/003* (2013.01); *G01R 27/2605* (2013.01)

(58) Field of Classification Search
None
See application file for complete search history.

(56) References Cited

U.S. PATENT DOCUMENTS

| | | | |
|---|---|---|---|
| 7,904,731 B2 | 3/2011 | Devadas et al. | |
| 9,279,850 B1* | 3/2016 | Pedersen | G01R 31/2851 |
| 2011/0317829 A1 | 12/2011 | Ficke et al. | |
| 2014/0266297 A1* | 9/2014 | Mathew | H03K 19/00369 326/9 |
| 2014/0327468 A1* | 11/2014 | Pfeiffer | H03K 19/003 326/8 |

\* cited by examiner

*Primary Examiner* — Anh Tran
(74) *Attorney, Agent, or Firm* — Fletcher Yoder, P.C.

(57) ABSTRACT

Apparatus for identifying stable physically unclonable function (PUF) cells includes an array of PUF cells, a bias control circuit, and a selector circuit. The bias control circuit has a plurality of bias control lines that apply one or more bias control signals to each PUF cell in the array of PUF cells. The selector circuit selects a subset of the PUF cells in the array of PUF cells based on whether outputs of the PUF cells in the array of PUF cells change in response to application of the bias control signals. A corresponding method is also disclosed.

20 Claims, 11 Drawing Sheets

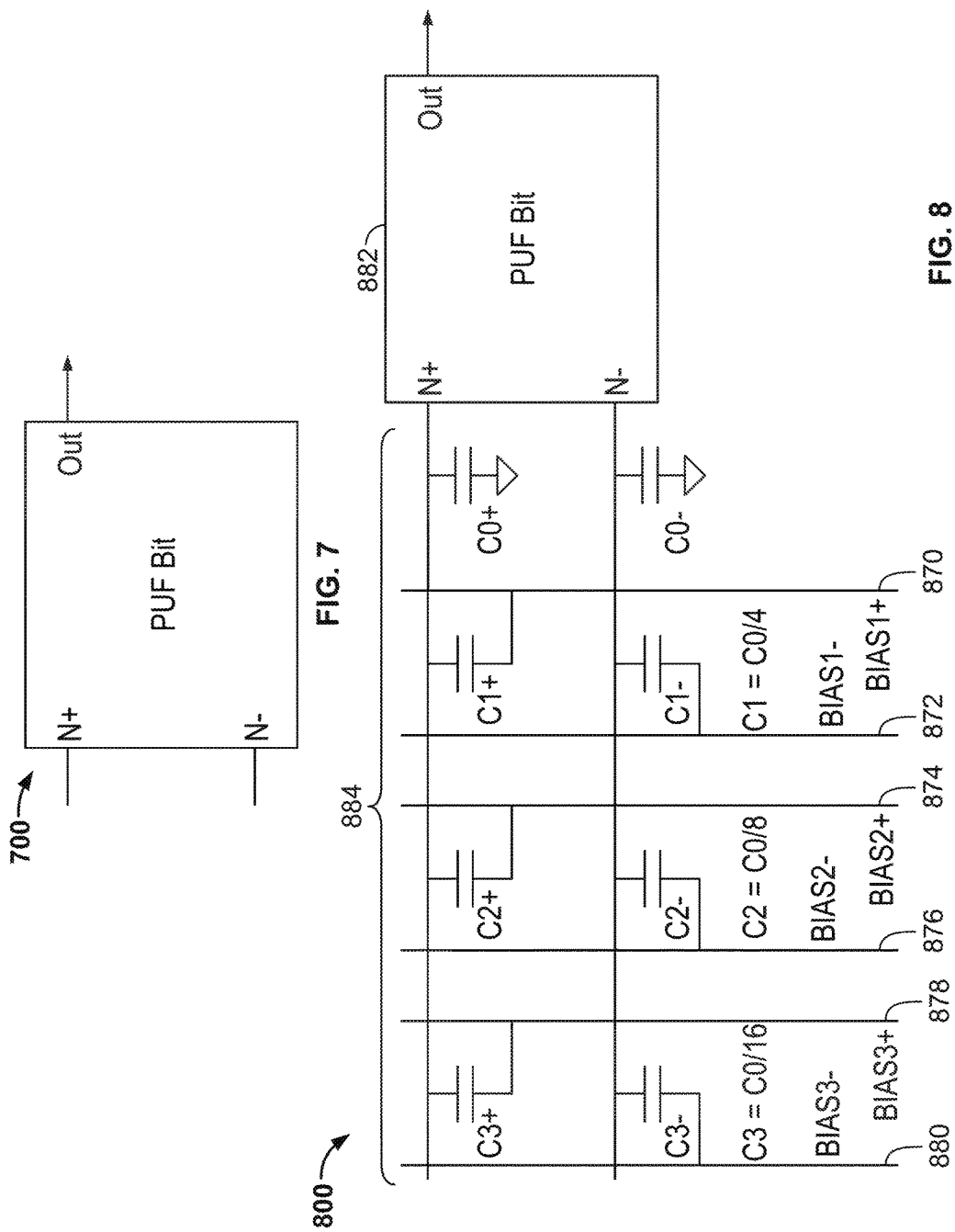

PHYSICALLY UNCLONABLE FUNCTIONS WITH ENHANCED MARGIN TESTING

CROSS REFERENCE TO RELATED APPLICATIONS

This application is a continuation of U.S. patent application Ser. No. 14/620,495 filed Feb. 12, 2015 (now allowed), which claims priority to U.S. Provisional patent application Ser. No. 61/940,076, filed Feb. 14, 2014, each of which is hereby incorporated by reference in its entirety.

FIELD

The present disclosure relates to a method and an apparatus for enhancing the stability of physically unclonable functions.

BACKGROUND

A Physically Unclonable Function (PUF) is a physical circuit inside an integrated circuit device whose behavior is determined by random physical variations inside the integrated circuit or within the proximate environment of the integrated circuit. PUFs may be used to derive encryption keys for configuring Programmable Logic Devices (PLDs) such as Field Programmable Gate Arrays (FPGAs), which are integrated circuits that include programmable logic blocks and programmable routing. The random physical variations in and around the integrated circuits may be due to random manufacturing variations within the device (such as variations in transistor thresholds, transistor driver strengths, capacitances, or resistances), or may be due to explicitly added sources of variations (such as device coatings that contain a slurry of dielectric particles that cause random fluctuations in capacitance sensors).

Because of these variations, corresponding PUFs on multiple ostensibly identical devices will behave differently. Sometimes, a PUF will accept an input (called a challenge), and produce an output (called a response). A response may include multiple bits. Alternatively, a PUF may return a response with no need for an explicit challenge. The random variations between ostensibly identical devices may cause the corresponding PUFs in different devices to return different responses under the same conditions (including in response to the same challenges).

PUF responses may be used to create, encrypt, or obfuscate encryption keys. The PUF responses can also be used to create unique ID values that can be used to uniquely identify a device, or to otherwise make one device behave differently from another ostensibly identical device. These use cases require, for a particular instance of a device, that the PUF response for a particular challenge input be stable (such that it consistently returns the same value for that challenge on that device).

SUMMARY

The present disclosure provides systems and methods for improving the stability of PUFs. In one embodiment, an apparatus is provided for identifying stable physically unclonable function (PUF) cells. The apparatus includes an array of PUF cells, a bias control circuit, and a selector circuit. The bias control circuit has a plurality of bias control lines, which apply one or more bias control signals to each PUF cell in the array of PUF cells. The selector circuit selects a subset of the PUF cells in the array of PUF cells based on whether outputs of the PUF cells in the array of PUF cells change in response to application of the bias control signals.

The bias control circuit may include at least one capacitor coupling a node of a PUF cell in the array of PUF cells and one of the one or more bias control signals. Each PUF cell in the array of PUF cells may be based on a voltage and may be a butterfly PUF cell or a SRAM PUF cell.

The bias control circuit may include at least a transistor connected to a load capacitor such that when the transistor is disabled, the load capacitor is disconnected from a delay path for a PUF cell in the array of PUF cells. Each PUF cell in the array of PUF cells may be based on a delay and may be an arbiter PUF cell or a ring oscillator PUF cell.

The apparatus may further include a polarity control circuit that selectively changes a polarity of at least one bias control signal before the one or more bias control signals are applied to each PUF cell in the array of PUF cells. The polarity control circuit may selectively change the polarity based on a nominal response of the PUF cells.

A first PUF cell that has a changed output when the one or more bias control signals are applied to the first PUF cell may be less stable than a second PUF cell that has an unchanged output when the one or more bias control signals are applied to the second PUF cell. The selector circuit may select the subset of PUF cells by selecting a predetermined number of PUF cells in the array of PUF cells that are more stable than a remainder of the PUF cells in the array of PUF cells.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 7 shows an illustrative block diagram of a balanced PUF bit cell, in accordance with some embodiments of the present disclosure;

FIG. 8 shows an illustrative block diagram of a bias control circuit for a balanced PUF bit cell, in accordance with some embodiments of the present disclosure;

DETAILED DESCRIPTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

The figures described herein show illustrative embodiments, however the figures may not necessarily show and may not be intended to show the exact layout of the hardware components contained in the embodiments. The figures are provided merely to illustrate the high level conceptual layouts of the embodiments. The embodiments disclosed herein may be implemented with any suitable number of components and any suitable layout of components in accordance with principles known in the art.

A response of a PUF on a device for a particular challenge input should be stable, so that the response of the PUF consistently returns the same value for that particular challenge. However, random variations in or around the device on which the PUF response depends may vary over time. These variations may be due to changes in operating temperature or operating voltage, stress-related changes in transistor characteristic due to Negative Bias Threshold Instability (NBTI), Positive Bias Threshold Instability (PBTI), or accumulated environmental radiation effects, or simply to thermal noise. The variations can cause the response of the PUF to change, or "flip". As used herein, "flip" refers to a change in PUF response and is an indication of instability. As an example, a PUF bit cell may provide a PUF response of a '0' or a '1' value under certain conditions. When those conditions change (due to any of the random variations described above, for example), the PUF response sometimes flips, meaning that the PUF response that was originally a '0' has changed to a '1' or the PUF response that was originally a '1' has changed to a '0'. Most of the present disclosure is described with respect to PUF bit cells exhibiting flipping behavior as an indication of instability. However, in general, one of ordinary skill in the art will understand that the present disclosure is also applicable to systems in which a PUF response may take on non-binary values, and changes in those non-binary values are indications of instability.

Figure 5:
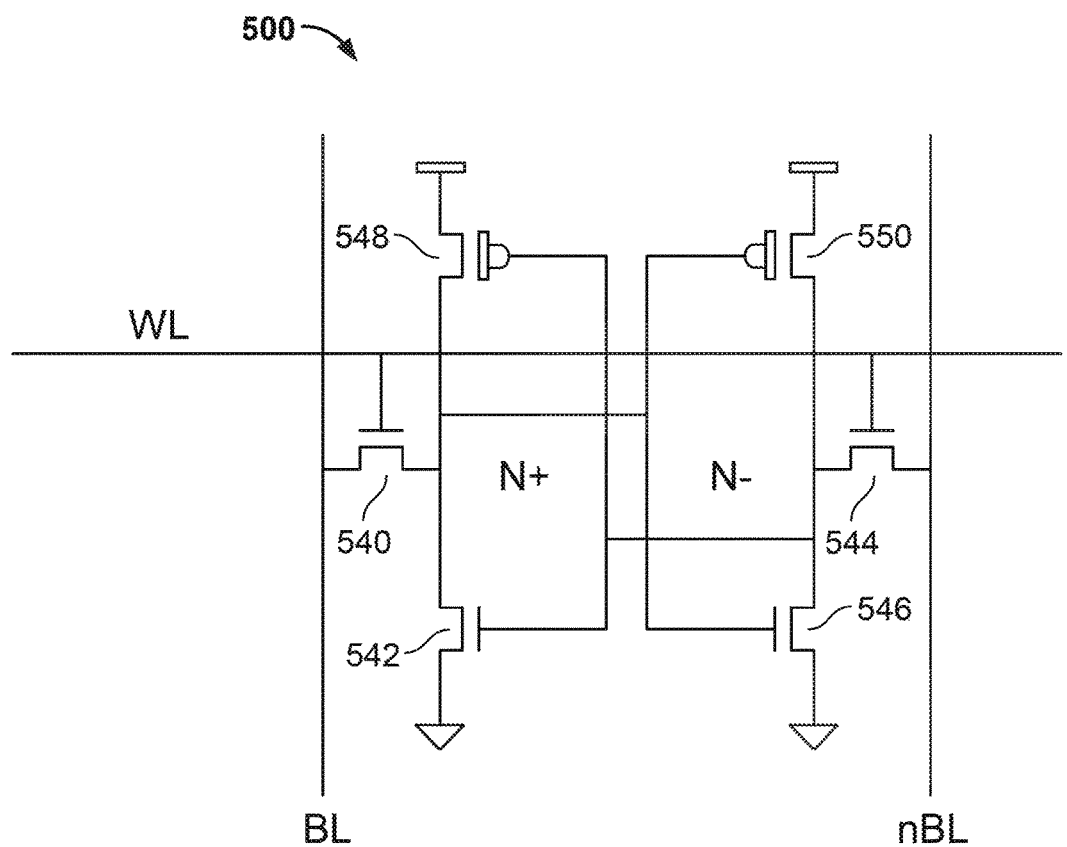
FIG. 5 shows an illustrative block diagram of a balanced SRAM PUF, in accordance with some embodiments of the present disclosure.

As an example, SRAM cells, such as the SRAM cell shown in FIG. 5, often power up to an unknown state in a random pattern. Depending on the various strengths of the transistors in the SRAM cell, an SRAM cell may power up to a '0' or a '1' value. The various strengths of the transistors arise from random manufacturing variations that may vary from transistor to transistor that cause the transistors to have different threshold voltages. Moreover, the threshold voltages may vary with age of the device. These variations may cause instability in PUF bit cells, which causes PUF responses to be unpredictable. The present disclosure describes systems and methods for increasing the stability of PUFs.

Examples of PUFS include arbiter PUFs, ring-oscillator PUFs, butterfly PUFs, and SRAM PUFs. One technique for stabilizing such PUFs is to read a PUF response multiple times, and, for each response bit, use the value of that bit that occurs most often (this is referred to as "majority voting"). One problem with majority voting is that it is only effective for averaging away truly random fluctuations—such as those due to thermal noise, and cannot correct consistent changes in variation due to factors such as aging and stress.

Another technique for stabilizing PUFs makes use of additional non-volatile "helper-data". PUF implementations use helper-data by reading a first set of one or more responses for a given challenge input, generating a non-volatile helper that will aid in the re-creation of future responses for the challenge input, and then saving the helper data in (possibly public) non-volatile storage. This may be referred to as the "recruitment phase". In one example, helper-data may be used in Error Correcting Codes (ECC), where the helper data may include an error-correction syndrome for the response. However, one problem with using ECC is that the syndrome reveals some information about the PUF response, which becomes especially problematic when the number of bits in the syndrome approaches the number of bits of entropy in the PUF response. Thus, using helper-data in ECC is particularly undesirable when the PUF response is used to create encryption keys that should be kept secret.

In another example, helper-data may be used to select a subset of PUF response bits which appear to be the most stable, and mask out those response bits that do not appear to be stable. This may be performed during the recruitment phase by reading the PUF response multiple times and counting how many times a particular PUF response bit is a 0 or 1. One problem with this technique is that it can only detect marginal response bits whose margin is on the order of the thermal noise. For example, if the source of variation for a PUF is due to variations in transistor threshold voltages (which is a major source of variation for many PUFs), and the standard deviation in the threshold voltage is 30 mV, about half of the PUF bits would have a margin of above 30 mV, but some of the PUF response bits may have a lower margin such as equal to or less than 6 mV. If the thermal noise were 1 mV, only PUF response bits whose margin was on the order of 2-3 mV may be detected using this technique. However, it is more challenging to test the stability of PUF cells with margins that are higher than a small multiple of the thermal noise, because these cells would tend to exhibit stable behavior. The systems and methods of the present disclosure improve upon these techniques by enhancing the ability to check the margin of each response bit.

One way to enhance the margin testing of a response bit is to apply one or more bias control lines to a PUF bit cell. Although some of the figures of the present disclosure may indicate specific numbers of bias control lines used in some of the illustrative embodiments, those numbers of bias control lines may be provided by way of example only. The embodiments disclosed herein may be implemented to accommodate any suitable number of bias control lines.

The bias control lines form an assertion pattern (a pattern of zeros and ones, for example) that may be applied to an array of PUF bit cells, where each PUF bit cell corresponds to one response bit. As used herein, an assertion pattern that gives rise to approximately an equal number of 0 and 1 response bit values may be referred to as a nominal bias setting of the bias control lines. The resulting bias may be referred to herein as the nominal bias. In contrast, an assertion pattern that on average, causes more than half of the response bits to be read as a 1 may be referred to as a positive bias setting. An assertion pattern that on average, causes more than half of the response bits to be read as a 0 may be referred to as a negative bias setting.

In accordance with some embodiments of the present disclosure, during the recruitment phase, a PUF response is initially read under nominal bias. Multiple reads may be additionally performed to obtain further PUF responses, and majority voting on each bit may be performed to compute the most common response for each bit. After the nominal response for each PUF bit is determined, the bias control signals may be used to measure the stability of each response bit.

Figure 1:
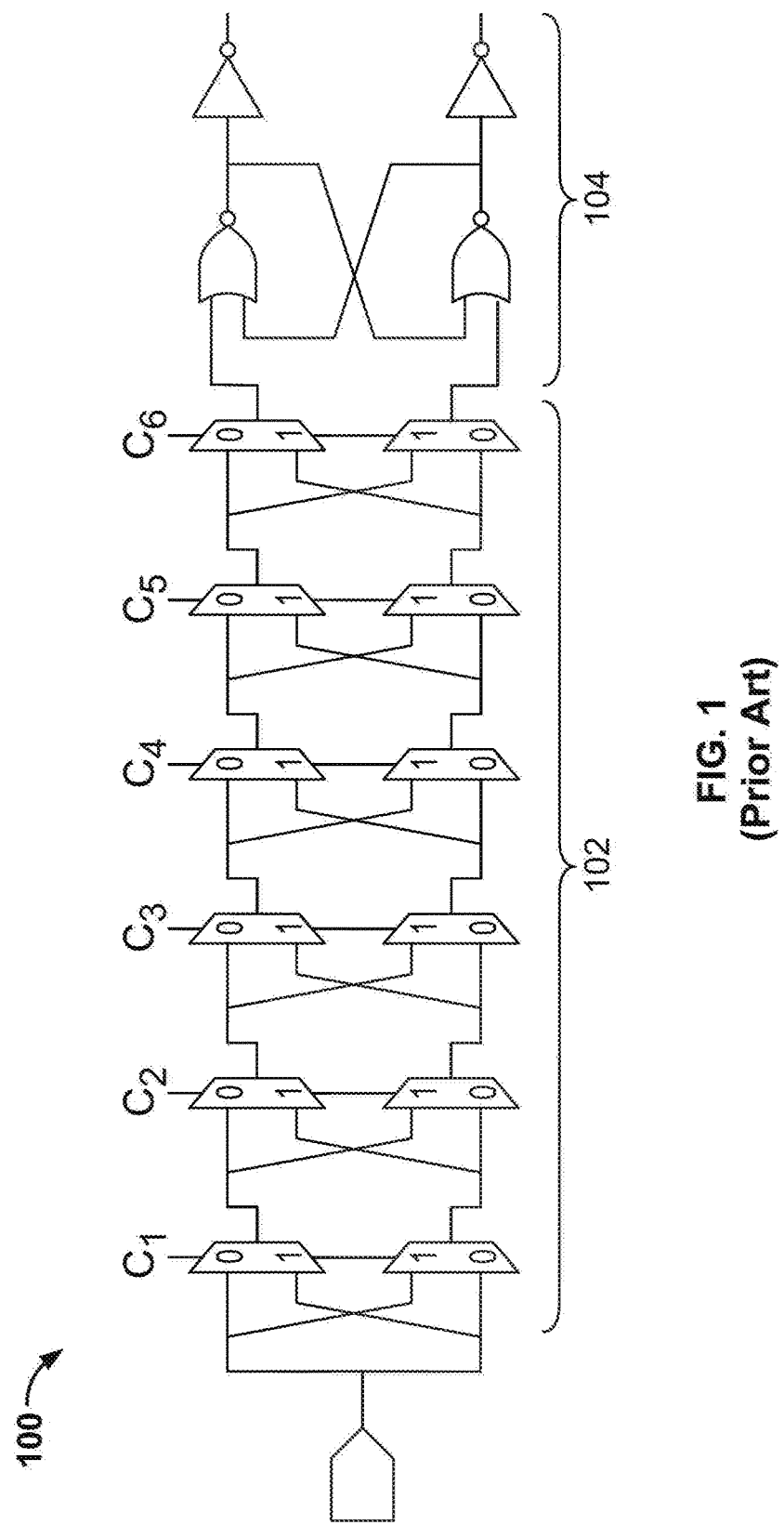
FIG. 1 shows an illustrative block diagram of a delay-based arbiter PUF, in accordance with the prior art.
Figure 2:
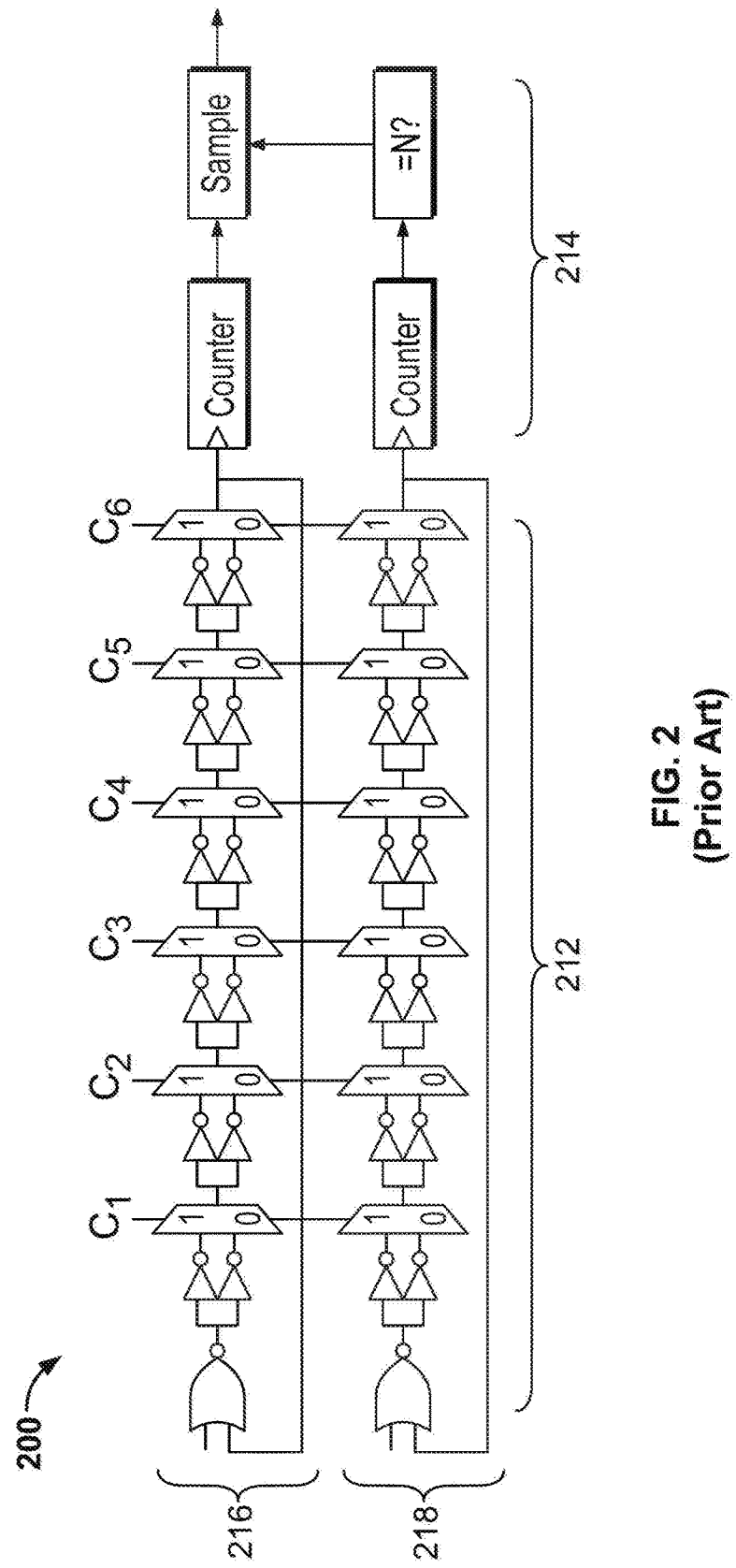
FIG. 2 shows an illustrative block diagram of a delay-based ring oscillator PUF, in accordance with the prior art.
Figure 6:
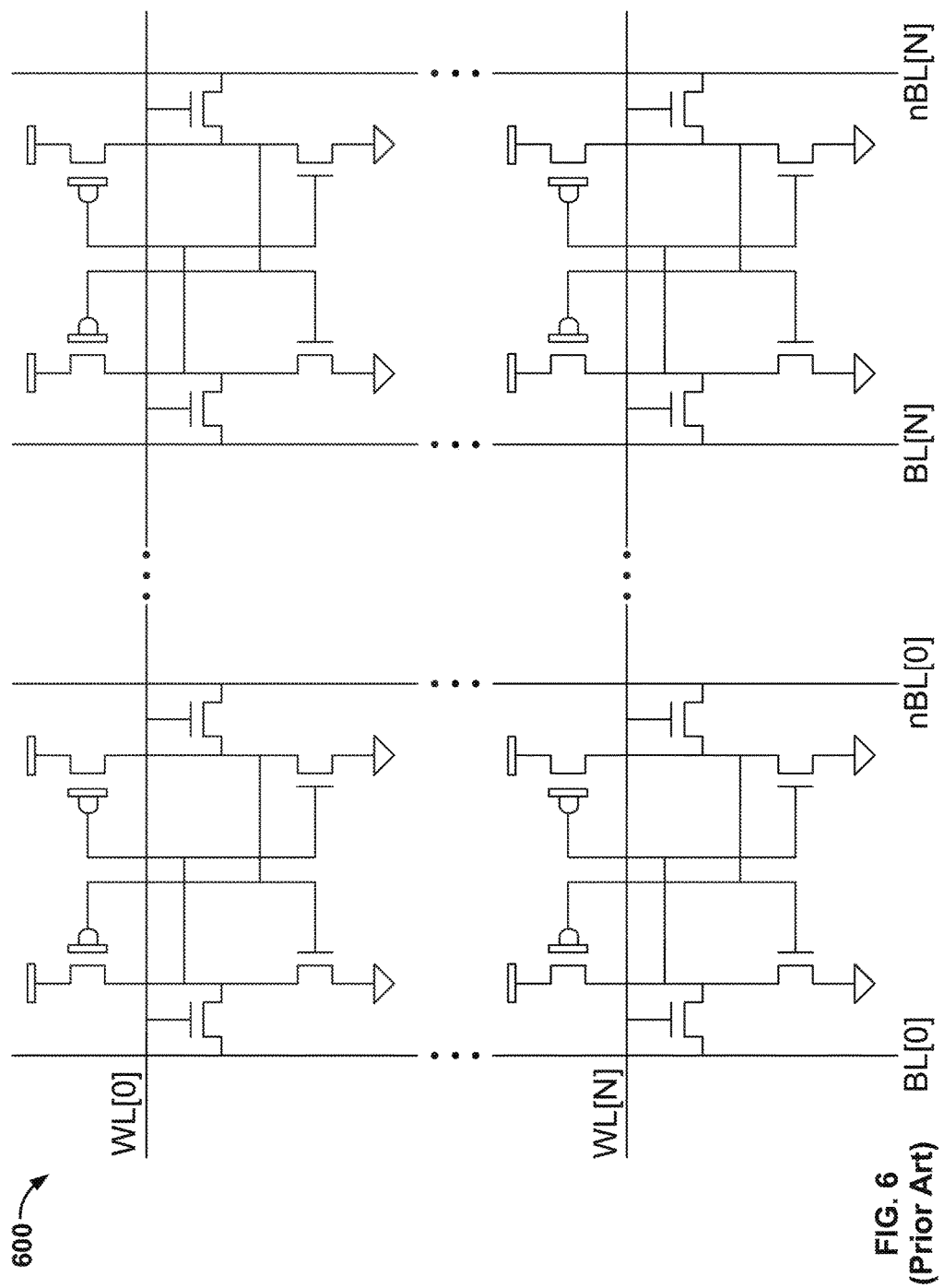
FIG. 6 shows an illustrative block diagram of a matrix of SRAM bit cells, in accordance with the prior art.
Figure 10:
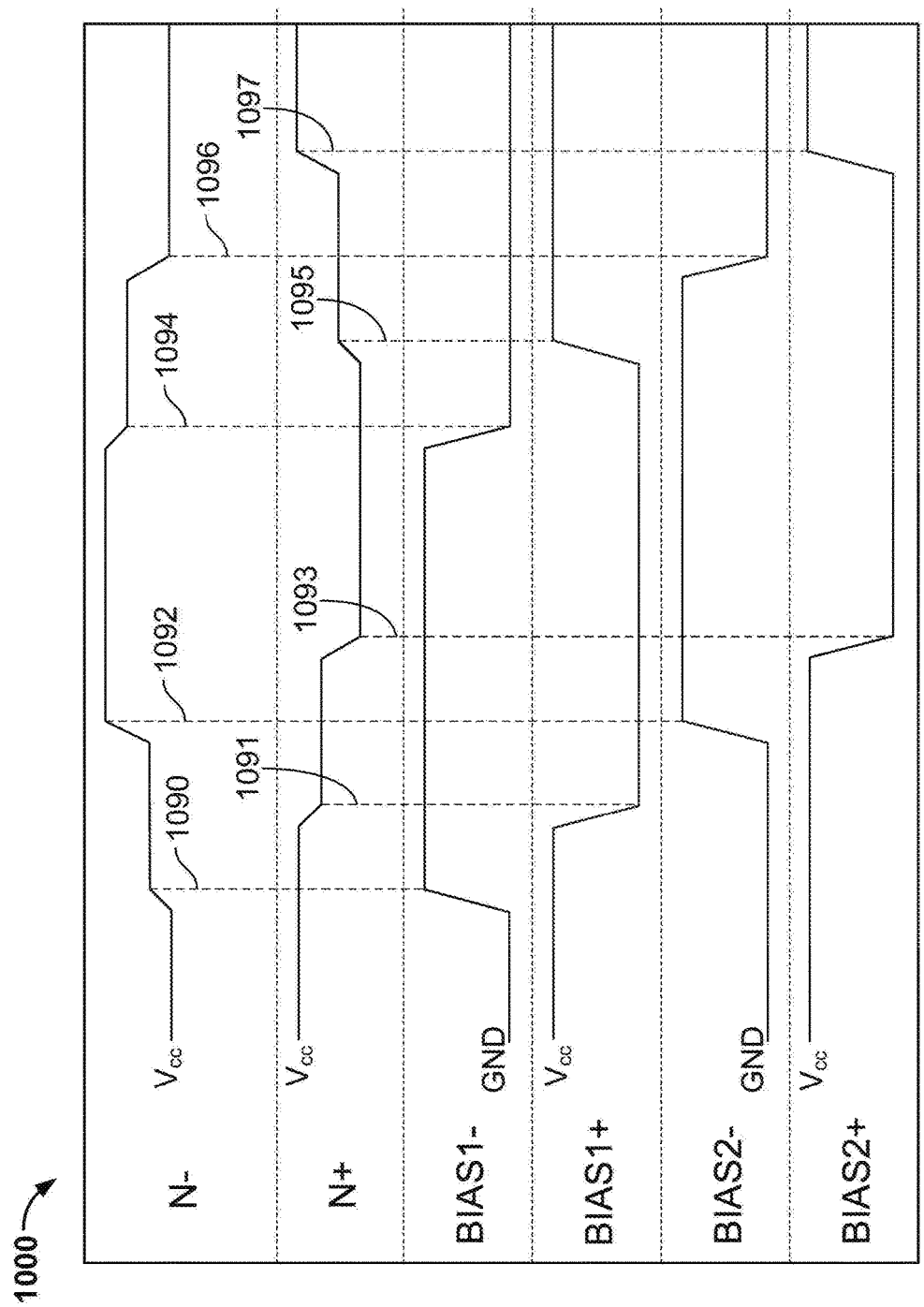
FIG. 10 shows an illustrative graph of various voltage levels at a bias control circuit and a PUF bit cell, in accordance with some embodiments of the present disclosure.
Figure 11:
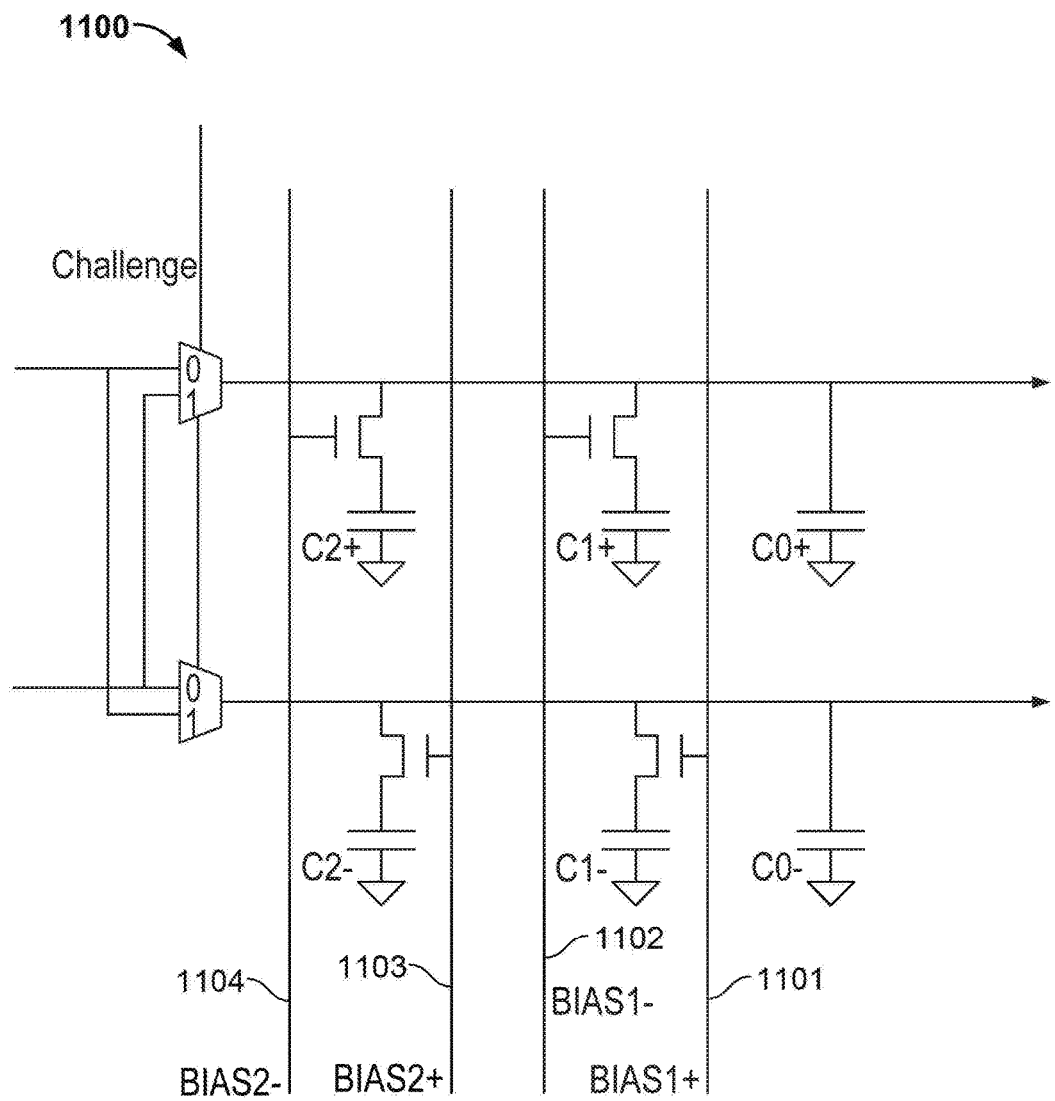
FIG. 11 shows an illustrative block diagram of a bias control circuit for a delay-based PUF bit cell, in accordance with some embodiments of the present disclosure.
Figure 12:
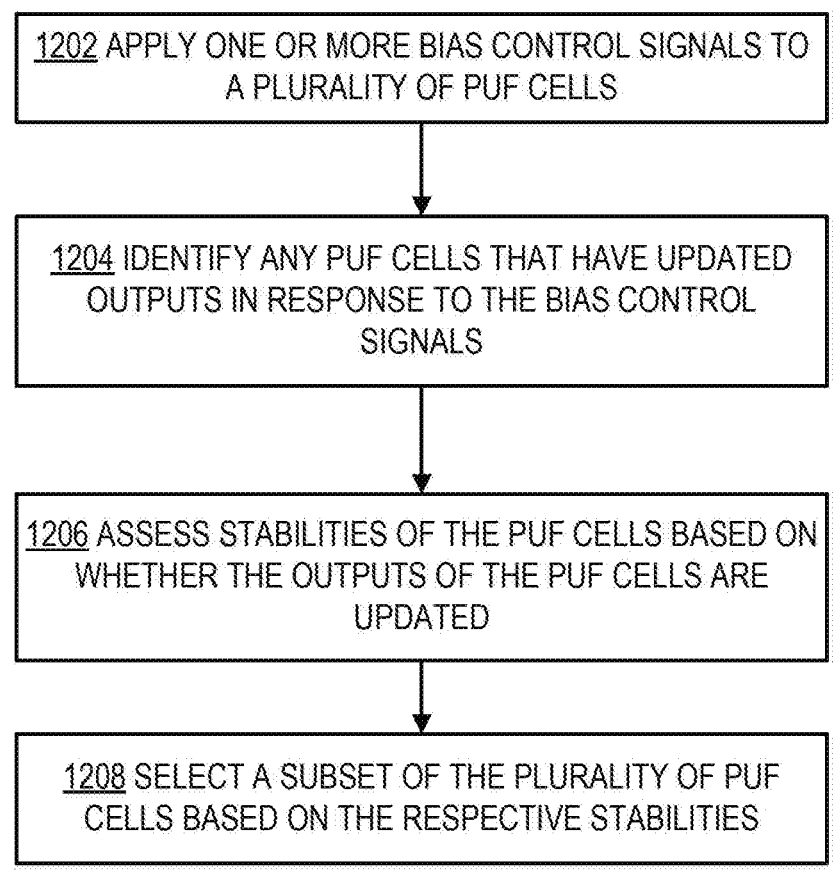
FIG. 12 shows an illustrative flow diagram of a process for improving the stability of an array of PUF cells, in accordance with some embodiments of the present disclosure.

The systems and methods of the present disclosure may be described in detail with reference to FIGS. 1-12. More particularly, FIGS. 1, 2, and 6 show block diagrams of known implementations of various PUFs and SRAM bit cells in accordance with the prior art. Various implementations of PUF cells in accordance with the present disclosure are described with reference to FIGS. 3-5 and 7-9. A graphical example of an effect of bias control signals on complementary nodes in a PUF cell is shown in FIG. 10, and a delay-based PUF cell, in accordance with the present disclosure, is described with reference to FIG. 11. A flow diagram of a method for enhancing the stability of a PUF cell, in accordance with some embodiments of the present disclosure, is shown in FIG. 12.

PUFs may be implemented based on voltages or delays. In particular, depending on the particular PUF implementation, the systems and methods of the present disclosure may use different circuitry for enhancing the stability of the PUF bit. Some balanced PUFs, such as butterfly PUFs shown in FIGS. 3 and 4 and SRAM PUFs shown in FIGS. 5 and 6, strongly depend on the initial voltages of a pair of complementary nodes. Often, the initial voltage variations on these nodes may be as significant, and in some cases indistinguishable, from the underlying variations that that the PUF is attempting to measure (such as the threshold voltage of a transistor).

Figure 9:
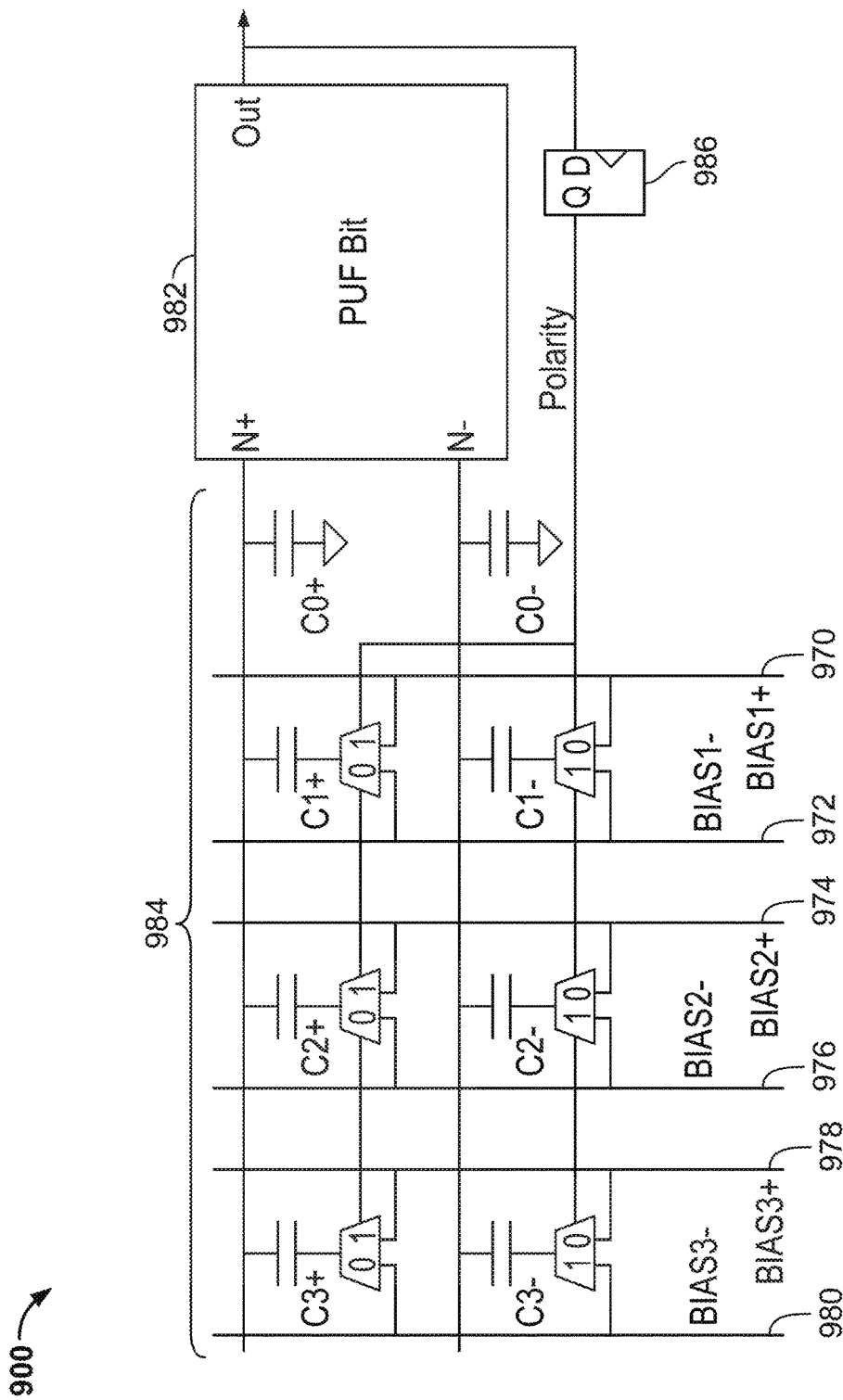
FIG. 9 shows an illustrative block diagram of a bias control circuit and a polarity control block for a balanced PUF bit cell, in accordance with some embodiments of the present disclosure.

In such cases, the systems and methods of the present disclosure may include one or more capacitors coupled to each of the complementary nodes such that the voltage level on a bias control line is coupled to one of complementary nodes through one of those capacitors, as is shown in FIGS. 8 and 9 in accordance with some embodiments of the present disclosure. Capacitors feeding the complementary nodes are coupled to different bias control lines, such that changing the voltage on the bias control line may change the voltage on the complementary node. In particular, a voltage change on a control line may be coupled through the connected capacitor to one of the complementary nodes. If the value of the coupling capacitor is equal to 1/X of the value of the overall capacitance on the complementary node from all sources, then the voltage differential coupled onto the complementary node may be equal to 1/X of the voltage differential on the switching control signal. By coupling different control signals though different valued capacitors, each control signal may effect a different bias on the complementary node to which it is connected.

Rather than relying on the initial voltage, other PUFs may rely on variations in overall path delays. Examples of delay-dependent PUFs include arbiter PUFs, such as the arbiter PUF shown in FIG. 1, and ring oscillator PUFs, such as the ring oscillator PUF shown in FIG. 2. For such delay-dependent PUFs, the systems and methods of the present disclosure use control signals to bias the delays through one or more paths. In some embodiments, the control signals couple additional parasitic loading onto one or more nodes that comprise the one or more paths. A delay-dependent PUF in accordance with the present disclosure is shown in FIG. 11.

The present disclosure enhances the ability to measure the margin of a response bit for a PUF by adding one or more bias control signals that bias the response of one or more PUF response bits. As an illustrative example and with no loss in generality, when a bias control signal is asserted, a PUF bit will be slightly more likely to be read as a 1 than when the bias control signal is not asserted. These bias control signals may be static (level-sensitive) or dynamic (edge-sensitive). In particular, static bias control signals may be applied to delay-based PUF cells, such as that shown in FIG. 11, and dynamic bias control signals may be applied to voltage-based PUF cells, such as those shown in FIGS. 8 and 9.

FIGS. 1 and 2 show two example block diagrams of known delay-based PUFs. In particular, FIG. 1 shows a block diagram of an arbiter PUF circuit 100, which includes a set 102 of twelve multiplexers and an arbiter 104. The left side of the arbiter PUF circuit 100 receives a rising signal, which splits into two paths and travels toward the right side of the circuit 100. The arbiter PUF circuit 100 also receives a six-bit challenge input C[1:6] and computes an output based on a relative delay difference between the two paths. The challenge input bits C[1:6] are used to control the routing multiplexers on the two paths with ostensibly equal delays. The challenge input bits C[1:6] control pairs of multiplexers of the set 102 to select whether or not to switch the top and bottom signals when passing two delay signals. In particular, when a challenge input bit is 0, the corresponding pair of multiplexers in the set 102 pass through the two delay signals without switching the top and bottom signals. Alternatively, when a challenge input bit is 1, the top and bottom signals are switched before being passed through the corresponding pair of multiplexers.

Manufacturing variations in the multiplexers in the set 102 and line drivers cause the two paths to have different delays that depend on the path specified by the challenge input bits. By selectively switching and passing the top and bottom signals, different sets of challenge input bits C[1:6] will give rise to different delay paths. The first path to reach the arbiter 104, which includes a set/reset latch composed of two cross-coupled NOR gates causes either a 1 or a 0 to be latched.

FIG. 2 shows a block diagram of a ring oscillator PUF circuit 200, in accordance with the prior art. The ring oscillator PUF circuit 200 includes a first ring oscillator 216, a second ring oscillator 218, and a counter circuit 214. The delay of the ring oscillator PUF circuit 200 is controlled by a set of six challenge input bits C[1:6], which are provided as control signals to a set of twelve multiplexers 212, six of which are included in the first ring oscillator 216, and six of which are included in the second ring oscillator 218. The first ring oscillator 216 and the second ring oscillator 218 include loops that oscillate at certain frequencies. The loops drive the two counters in the counter circuit 214 in FIG. 2, which is used to produce response bits to a particular challenge. In particular, after the second ring oscillator 218 has completed a fixed number N of cycles, the first ring oscillator 216 is latched. Depending on the differences in delay in between the two ring oscillators 216 and 218, the first ring oscillator 216 may take more or fewer cycles than the second ring oscillator 218. The number of cycles taken by the first ring oscillator is used as the PUF response.

Figure 3:
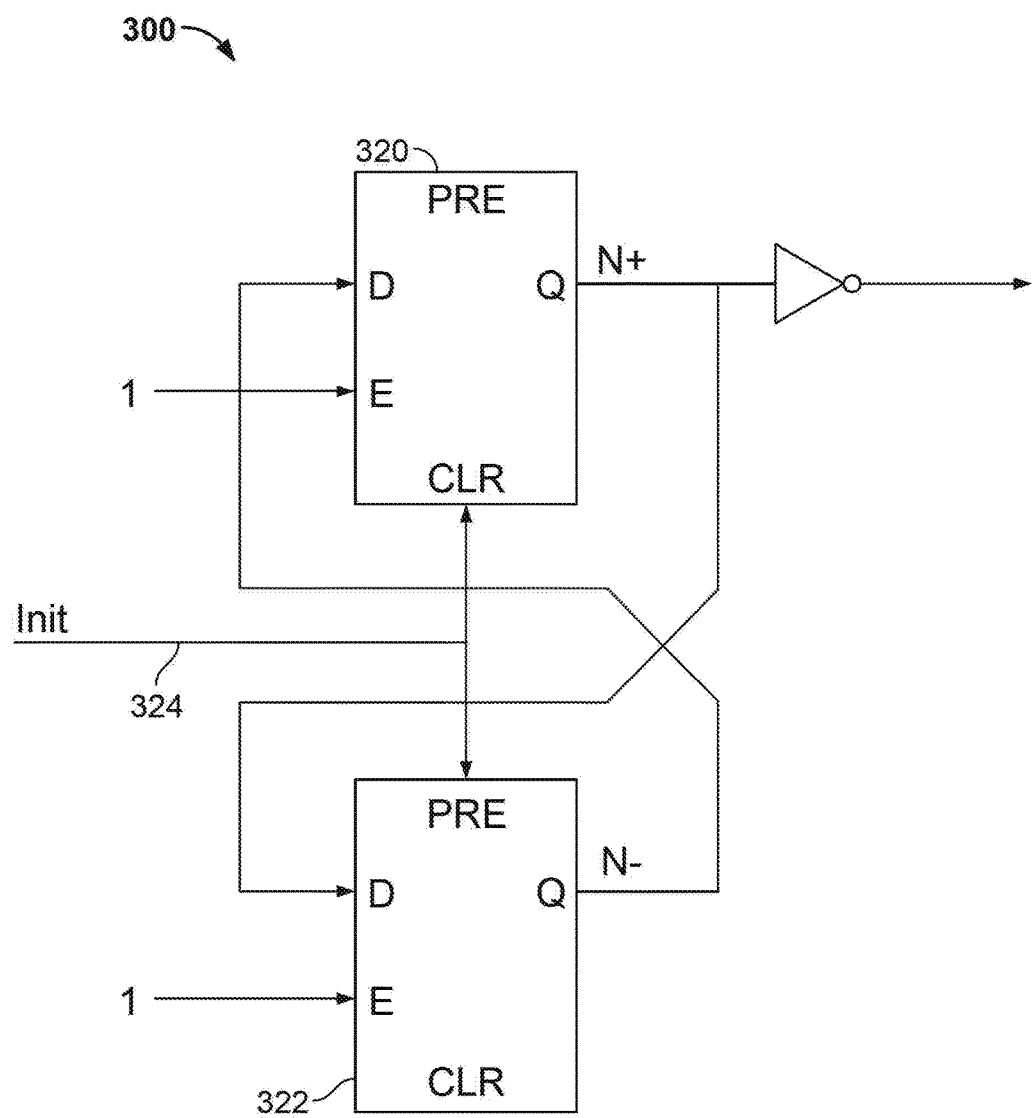
FIG. 3 shows an illustrative block diagram of a balanced butterfly PUF, in accordance with some embodiments of the present disclosure.
Figure 4:
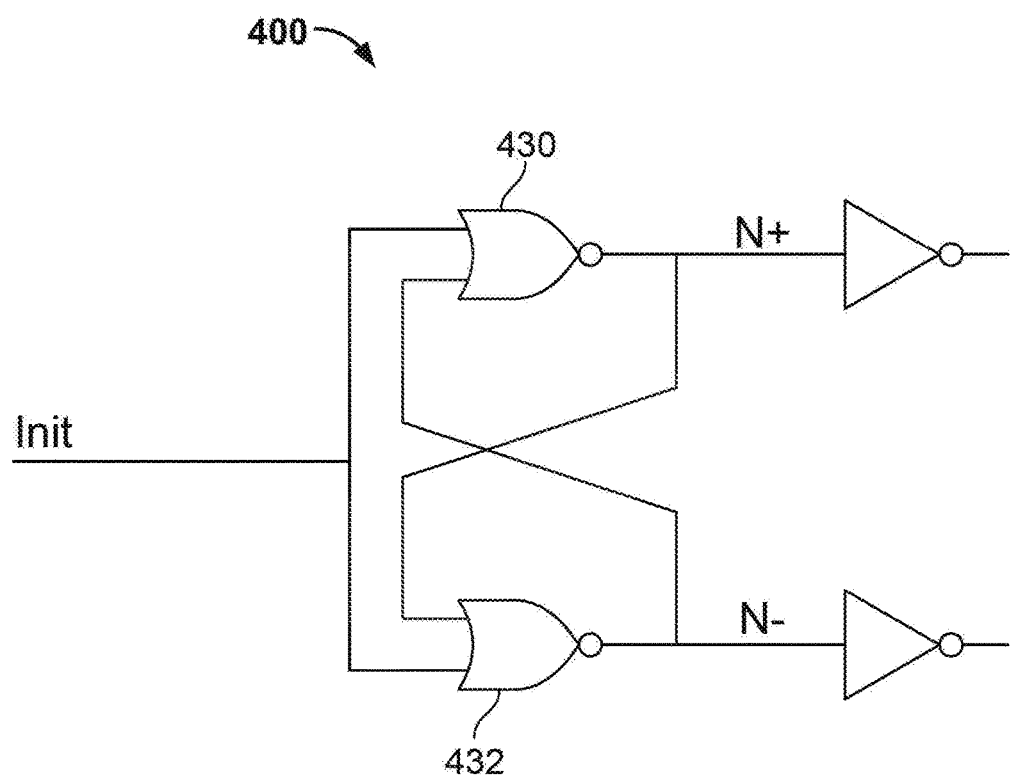
FIG. 4 shows an illustrative block diagram of a logic-based butterfly PUF, in accordance with some embodiments of the present disclosure.

While FIGS. 1 and 2 show examples of known delay-based PUF circuits, FIGS. 3-5 show voltage-based PUF circuits according various embodiments of the present disclosure. FIG. 3 shows a block diagram of a balanced butterfly PUF circuit 300, in accordance with some embodiments of the present disclosure. The butterfly PUF circuit 300 includes two cross-coupled level sensitive latches 320 and 322. Both latches 320 and 322 may be permanently enabled such that the latches 320 and 322 are in a flow-through mode. In this case, during initialization, one latch is asynchronously cleared to 0 while the other latch is asynchronously set to 1. In accordance with the present disclosure, the complementary nodes of the balanced butterfly PUF circuit 300 are labeled N+ and N−. When the "init" signal 324 becomes non-asserted, the cross-coupled latches 320 and 322 settle into either a 00 state or a 11 state, depending on manufacturing variations and initial conditions on the N+ and N− nodes.

FIG. 4 shows a block diagram of a logic-based butterfly PUF circuit 400, in accordance with some embodiments of the present disclosure. The logic-based butterfly PUF circuit 400 includes two NOR gates 430 and 432, and the complementary nodes of the balanced PUF are labeled N+ and N−. As shown in FIG. 4, the logic-based butterfly PUF circuit 400 is implemented using two NOR gates 430 and 432, but in general a logic-based balanced PUF may be implemented using any type or number of logic devices.

FIG. 5 shows a block diagram of a balanced SRAM bit cell 500, in accordance with some embodiments of the present disclosure. The balanced SRAM bit cell 500 includes six transistors 540, 542, 544, 546, 548, and 550. The four transistors 540, 542, 544, and 546 form two cross-coupled inverters. The complementary nodes of the balanced SRAM cell 500 are labeled N+ and N−.

FIG. 6 shows a block diagram of a matrix of known SRAM bit cells 600. In particular, each of the (N+1)×(N+1) SRAM bit cells in the matrix includes six transistors and may be equivalent to the SRAM bit cell 500 shown in FIG. 5.

FIG. 7 shows a block diagram of a balanced PUF bit cell 700, in accordance with some embodiments of the present disclosure. The output of the PUF bit cell 700 depends at least partially on the initial voltage level at the complementary nodes N− and node N+. The PUF bit cell 700 is a generalized balanced cell that may represent any of the balanced circuits shown and described in relation to any of the circuits shown in FIGS. 3-5.

FIG. 8 shows a block diagram 800 of a balanced PUF bit cell 882 and a bias control circuit 884 including six bias control lines 870, 872, 874, 876, 878, and 880, in accordance with some embodiments of the present disclosure. The complementary nodes of the balanced PUF bit cell 882 are connected via coupling capacitors C[1:3]+ and C[1:3]− to bias control lines BIAS[1:3]+(shown as bias control lines 870, 874, and 878 in FIG. 8) and BIAS[1:3]− (shown as bias control lines 872, 876, and 880) respectively. The +/− suffixes for the coupling capacitors and the bias control lines specify whether the capacitor or control signal biases the N+ node or the N− node of the balanced PUF bit cell 882. The capacitors C0− and C0+ may represent the overall parasitic or other static capacitances on the N− and N+ nodes that are not controlled by any of the bias control signals.

As shown in FIG. 8, the capacitances of the various coupling capacitors vary for the different stages of capacitors. The largest pair of coupling capacitors C1− and C1+ may have capacitances that are ¼ of the overall parasitic capacitances C0− and C0+. The other pairs of coupling capacitors may have capacitances that sequentially decrease by a factor of 2× at each stage, such that C2− and C2+ have capacitances that are ⅛ of the capacitances C0− and C0+, and C3− and C3+ have capacitances that are 1/16 of the capacitances C0− and C0+. The capacitors and bias control signals 870, 872, 874, 876, 878, and 880 shown in block diagram 800 are shown for illustrative purposes only, and one of ordinary skill in the art will understand that any number of capacitors with any set of capacitances may be used without departing from the scope of the present disclosure.

In the example shown in FIG. 8, six bias control signals 870, 872, 874, 876, 878, and 880 are shown. Sequentially asserting additional bias control signals will cause the response bit to become progressively more likely to be read as a 1 (or a 0). The degree of bias that each bias control signal has over the response bit may be the same or may differ. In order to effect a different degree of bias for each bias control signal, the bias control signals may be ordered such that each bias control signal has twice the biasing effect of the prior bias control signal, for example. In this case, the amount of bias may be fine-tuned by applying a binary value to the bias-control signals. In general, other ratios, such as 0.5×, 1.5×, 3×, 4×, 5×, or any other suitable ratio, may be used. Moreover, the change in biasing effect across consecutive bias control signals may be the same or different without departing from the scope of the present disclosure.

In FIG. 8, only one PUF bit response cell is shown. In general, the bias control signals in FIG. 8 may be used to apply bias control signals to any number of PUF bits simultaneously or sequentially. When it is desirable to apply bias control signals to an array of PUF bits (e.g., a two-dimensional array), polarity control signals may be applied to different PUF bits in the array to change the polarity of the bias control signals that are applied to each PUF bit. For example, it may be desirable to apply positive bias control signals to bits in an array that have a nominal response of 0 and negative bias control signals to bits in the array that have a nominal response of 1. In this case, selectively asserting a set of polarity control signals may allow for the use of a single set of bias control signals to be applied to all the bits in the array.

FIG. 9 shows a block diagram 900 of a balanced PUF bit cell 982 and a bias control circuit 984 that includes six bias control lines 970, 972, 974, 976, 978, and 980, in accordance with some embodiments of the present disclosure. Similar to the block diagram 800 shown in FIG. 8, the complementary nodes of the balanced PUF bit cell 982 are connected via coupling capacitors C[1:3]+ and C[1:3]− to bias control lines BIAS[1:3]+(shown as bias control lines 970, 974, and 978 in FIG. 9) and BIAS[1:3]− (shown as bias control lines 972, 976, and 980) respectively. The +/− suffixes for the coupling capacitors and the bias control lines specify whether the capacitor or control signal biases the N+ node or the N− node of the balanced PUF bit cell 982. The capacitors C0− and C0+ may represent the overall parasitic or other static capacitances on the N− and N+ nodes that are not controlled by any of the bias control signals.

FIG. 9 is similar to the block diagram 800 shown in FIG. 8, except that FIG. 9 includes a polarity control block 986. In FIG. 9, the effects of the bias control signals 970, 972, 974, 976, 978, and 980 are modified by a polarity control signal, which is controlled by the initial output of the balanced PUF bit cell 982 and provides a control signal to six multiplexers. When the polarity control signal is asserted (i.e., when the control signal is a 1), the meaning of the bias control signals BIAS[1:3]+ and BIAS[1:3]−signals are reversed. Specifically, bias control signals 970 and 972 are reversed, bias control signals 974 and 976 are reversed, and bias control signals 978 and 980 are reversed. When the bias control signals are reversed in this manner, asserting the positive bias control lines 970, 974, and 978 may cause the PUF bit cell to be more likely to settle to a value of 0 rather than 1, and asserting the negative bias control lines 972, 976, and 980 may cause the PUF bit cell to be more likely to settle to a value of 1 rather than a value of 0. Otherwise, when the polarity control signal is not asserted (i.e., when the control signal is a 0), bias control signals are not reversed, and the behavior of the circuit shown in FIG. 9 is the same as the circuit shown in FIG. 8.

With the use of polarity control block 986, the nominal value of the corresponding response bit may be latched onto the polarity control line, such that asserting further bias control signals would bias the reading of that response bit away from its nominally read value. In other words, a positive bias may be applied if the nominal response bit value was a 0, and a negative bias may be applied if the nominal response bit value was a 1.

Even though only one PUF bit response cell is shown in FIG. 9, the bias control signals 970, 972, 974, 976, 978, and 980 may be used to apply bias control signals to any number of PUF bits simultaneously or sequentially. When it is desirable to apply bias control signals to an array of PUF bits, polarity control blocks such as polarity control block 986 may be applied to different PUF bits in the array to change the polarity of the bias control signals that are applied to each PUF bit. The use of polarity control block 986 allows the bias control signal circuitry in a PUF bit cell array to be efficient so that different bias control signals do not need to be applied to different PUF bits. In this way, polarity control allows the circuitry to save space and make use of the same set of bias control signals for an array of PUF bits, even if it is desirable to apply different polarities of the bias control signals to the PUF bits in the array.

FIG. 10 shows an example of the various voltage levels at four bias control lines and at two complementary nodes N− and N+, in accordance with some embodiments of the present disclosure. In the example of FIG. 10, the negative bias control lines BIAS1− and BIAS2− are initialized to a ground voltage (GND), the positive bias control lines BIAS1+ and BIAS2+ are initialized to a positive voltage $V_{CC}$, which may be the DC voltage from a power supply that is applied to a collector of a transistor. Similarly, the complementary nodes are both initialized to $V_{CC}$. When the bias control line BIAS1− has a voltage change from GND to $V_{CC}$ at time 1090, a lower positive voltage change is coupled to the complementary node N−, biasing the node N− to a value slightly above $V_{CC}$. At time 1091, the bias control line BIAS1+ has a voltage change from $V_{CC}$ to GND, which causes the node N+ to become slightly biased below $V_{CC}$.

Subsequently, when the other bias control signals BIAS2− and BIAS2+ have voltage changes at times 1092 and 1093, respectively, this applies larger voltage changes to nodes N− and N+ than when BIAS1− and BIAS1+ had voltage changes at times 1090 and 1091. In particular, at time 1092, the BIAS2− control signal has a voltage change from GND to $V_{CC}$, which causes the node N− to have a larger increase in voltage than the increase that occurred at time 1090. Similarly, at time 1093, the BIAS2+ control signal has a voltage change from $V_{CC}$ to GND, which causes the node N+ to have a larger decrease in voltage than the decrease that occurred at time 1092. This is because the BIAS2− and BIAS2+ control signals may have a larger capacitive coupling than the capacitive coupling of the BIAS1− and BIAS1+ control signals.

The voltage changes effected on the nodes N− and N+ that take place at times 1094, 1095, 1096, and 1097 mirror those that took place at times 1090, 1091, 1092, and 1093. In particular, the voltage changes affected on the complementary nodes N− and N+ that originated from voltage changes in the BIAS1− and BIAS1+ control signals are smaller than those that originated from voltage changes in the BIAS2− and BIAS2+ control signals.

As is described in relation to FIGS. 8 and 9, PUFs may be implemented based on voltages. In such cases, the systems and methods of the present disclosure may include coupling one or more capacitors to each of the complementary nodes and to different bias control lines, such that changing the voltage on the bias control line may change the voltage on the complementary node. The block diagrams of FIGS. 8 and 9 are shown as illustrative examples only, and one of ordinary skill in the art that any bias control circuitry that adjusts the voltages of the complementary nodes N− and N+ may be used without departing from the scope of the present disclosure. In one example, a voltage may be applied to the silicon in which one or more transistors reside, thereby using the body effect of the one or more transistors to give rise to changes in the voltages of the complementary nodes.

Rather than relying on voltages, other PUFs may rely on variations in overall path delays. For such delay-dependent PUFs, such as those shown in FIGS. 1 and 2, the systems and methods of the present disclosure use control signals to bias the delays through one or more paths. In some embodiments, the control signals add or remove additional parasitic loading onto the one or more the paths to cause or remove additional delays.

FIG. 11 shows a block diagram of bias circuitry 1100 for a delay-based PUF bit cell, in accordance with some embodiments of the present disclosure. The bias circuitry 1100 may be used in relation with an arbiter PUF such as the arbiter PUF circuit 100 shown in FIG. 1. As shown in FIG. 11, four load capacitors C1−, C1+, C2−, and C2+ provide capacitive loading, which may or may not be added to one or more of the delay paths by asserting one or more of the bias control signals 1101, 1102, 1103, and 1104. In particular, each of the bias control signals 1101, 1102, 1103, and 1104 is used to connect one terminal of a load capacitor C1−, C1+, C2−, and C2+ to one of the nodes along a delay path, and the other terminal of the load capacitor is tied to another node (as shown in FIG. 11, GND).

When any of the bias control signals 1101, 1102, 1103, and 1104 is asserted, the path through the node connected to the source of the pass gate that is controlled by that bias control signal is marginally slowed down, thereby increasing the delay of the corresponding path. In this way, the presence of the load capacitors and the bias control signals allows for enhanced control of the delays along the paths. Any number of bias control signals may be used to control any number of pass gates that are connected to load capacitors having the same or different capacitances. In one example, the C2+ and C2− load capacitors may have twice the capacitance as the C1+ and C1− capacitors. The capacitors C0+ and C0− represent the total parasitic capacitance on the complementary path nodes.

As is shown in FIG. 11, the coupling is performed using a pass transistor (or a complementary pair of pass transistors) whose gates are controlled (directly or indirectly) by the control signals, whose one or more sources are connected to one of the path nodes, and whose one or more drains are connected to a terminal of a capacitor, with the other terminal of the capacitor being tied to $V_{CC}$, GND, or another path node. However, in general, other implementations are possible, such as by changing the drive strengths of the path node drivers, or changing the power supply voltage for the path node drivers. In one example, multiplexers or any type of delay element may be added along the path lines to add incremental delays paths. In one example, a voltage may be applied to the silicon in which one or more transistors reside, using the body effect of the one or more transistors to give rise to additional delays. In general, one of ordinary skill in the art will understand that any suitable circuitry or method may be applied to systematically introduce or remove delays along any number of delay paths in a bias circuitry for a delay-based PUF cell without departing from the scope of the present disclosure.

FIG. 12 shows an illustrative flow diagram of a process 1200 for improving the stability of an array of PUF cells, in accordance with some embodiments of the present disclosure. In particular, FIG. 12 illustrates the application of a bias control circuit for performing margin testing on an array of PUF cells.

At 1202, one or more bias control signals are applied to a plurality of PUF cells. As described in relation to FIGS. 8 and 9, when the PUF cell is based on voltage, a bias control circuit may include a set of capacitors. Each capacitor may couple a node of the PUF cell and one of the bias control signals, such that the voltage applied to the bias control signal has an effect on the voltage at the node of the PUF cell. In this case, the PUF cell may be a butterfly PUF cell (as shown in FIG. 3 or 4) or an SRAM PUF cell (as shown in FIG. 5).

As described in relation to FIG. 11, when the PUF cell is based on delay, a bias control circuit may include a set of transistors and load capacitors that affect the delay of the PUF cell. In this case, the PUF cell may be an arbiter PUF cell (as shown in FIG. 1) or a ringer oscillator PUF cell (as shown in FIG. 2).

In some embodiments, the one or more bias control signals are modified before being applied to the plurality of PUF cells. In particular, a polarity control signal may be selectively applied for each of the one or more bias control signals. The polarity control signals may selectively change the polarity of each bias control signal that is applied to the PUF cells. As an example, the polarities that are selected for applying to the bias control signals may be based on the nominal responses of the PUF cells. In particular, when the nominal response of a PUF cell is 1, the polarity of the bias control signal may be selected so as to apply a negative bias to the PUF cell. Similarly, when the nominal response of a PUF cell is 0, the polarity of the bias control signal may be selected so as to apply a positive bias to the PUF cell. Selecting the polarities of the bias control signals in this way allows for marginal testing of the PUF cells, to identify PUF cells that may flip (or otherwise change) their responses away from the nominal responses.

At 1204, any PUF cells that have changed outputs in response to the bias control signals are identified, and at 1206, stabilities of the PUF cells are assessed based on whether the outputs of the PUF cells are changed. When a PUF cell has a flipped response when the bias control signals are applied, this may be a sign that the flipped PUF cell is unstable.

In some embodiments, an array of PUF cells includes more PUF cells than are needed for an application. In other words, an array of PUF cells contains M PUF cells, but only N PUF cells are necessary for an encryption, for example, where N<M. It may be desirable to identify the most stable subset of PUF cells in the array. In this case, when a PUF cell flips in response to an application of bias control signals to the PUF cell, the flipped PUF cell may be labeled as "unstable" and may be eliminated. The bias control signals may be adjusted to further test the margins of the remaining PUF cells (i.e., applying positive bias to those PUF cells with nominal response 0 and applying negative bias to those PUF cells with nominal response 1), and any of the remaining PUF cells that flip in response to the adjusted bias control signals may also be eliminated. This process may be iteratively repeated until N PUF cells remain. The remaining N PUF cells may be identified as the N most stable PUF cells out of the M PUF cells in the array.

The stability of a PUF cell may be assessed based on any number of factors. In one example, a PUF cell that does not flip even when different bias controls are applied may be labeled as stable. In another example, a PUF cell that flips the least often compared to other PUF cells may be labeled as stable. In another example, a PUF cell that requires the greatest magnitude bias control signals to flip may be labeled as stable. In another example, if N PUF cells are required for an application, the N/2 most stable PUF cells with nominal response 1 and the N/2 most stable PUF cells with nominal response 0 are selected as the stable set. In this case, a PUF cell with a nominally read 1 may be selected over an otherwise more stable PUF cell with a nominally read 0 (or vice versa). These examples are for illustrative purposes only, and one of ordinary skill in the art will understand that any combination of the methods described herein for determining stability, or any other suitable method for determining stability of a PUF cell, may be used without departing from the scope of the present disclosure.

In some embodiments, the bias control signals are swept over some range, and the PUF response bit values are read one or more times for each of the different bias settings. In particular, the nominally read 1 PUF cells may be read under various degrees of negative bias, and the nominally read 0 PUF cells may be read under various degrees of positive bias. In some embodiments, the number of PUF responses read for each of the different bias settings may be the same. Moreover, the number of used negative bias settings and the number of used positive bias settings may be the same. In some embodiments, for each positive bias setting that results in a particular positive bias value, a negative bias setting may be used that results in a negative bias value of the same magnitude as the corresponding positive bias value.

At 1208, a subset of the plurality of PUF cells is selected based on the respective stabilities. As an example, selecting the subset of the plurality of PUF cells may include selecting a predetermined number (i.e., N) of PUF cells in the plurality of PUF cells with the highest stabilities. In general, the selected subset of PUF cells may be selected based on the satisfaction of one or more criteria. The criteria may include identifying at least N PUF cells that are associated with stability scores that exceed some threshold. As an example, the stability score of a PUF cell may correspond to the smallest magnitude of the bias control signal that was required to cause the PUF cell to flip. As another example, the stability score of a PUF cell may correspond to a frequency at which the PUF cell flips in response to various bias control signals.

In some embodiments, when N PUF cells are required for an application, the N most stable PUF cells are selected, and helper data is used to mask out the remaining less stable bits.

The foregoing is merely illustrative of the principles of the embodiments and various modifications can be made by those skilled in the art without departing from the scope and spirit of the embodiments disclosed herein. The above described embodiments of the present disclosure are presented for purposes of illustration and not of limitation, and the present invention is limited only by the claims which follow.

What is claimed is:

1. An apparatus, comprising:
   a control circuit that applies one or more control signals to a physically unclonable function (PUF) cell; and
   a selector circuit that selects the PUF cell based on whether an output of the PUF cell changes in response to application of the one or more control signals;
   wherein the control circuit includes at least one capacitor coupling a node of the PUF cell and at least one of the one or more control signals.

2. The apparatus of claim 1, further comprising a plurality of PUF cells including the PUF cell, wherein at least one of the one or more control signals is applied to each PUF cell in the plurality of PUF cells.

3. The apparatus of claim 2, wherein the selector circuit selects a subset of the PUF cells in the plurality of PUF cells based on whether outputs of the PUF cells change in response to application of the at least one of the one or more control signals.

4. The apparatus of claim 2, wherein the one or more control signals form an assertion pattern, the assertion pattern comprising a pattern of zeros and ones that is applied to the plurality of PUF cells.

5. The apparatus of claim 1, wherein the control circuit includes at least a transistor connected to a load capacitor such that when the transistor is disabled, the load capacitor is disconnected from a delay path for the PUF cell.

6. The apparatus of claim 1, further comprising a polarity control circuit that selectively changes a polarity of at least one of the one or more control signals before the one or more control signals are applied to the PUF cell.

7. The apparatus of claim 1, further comprising a plurality of PUF cells including the PUF cell, wherein a first PUF cell that has a changed output when at least one of the one or more control signals is applied to the first PUF cell is determined to be less stable than a second PUF cell that has an unchanged output when at least one of the one or more control signals is applied to the second PUF cell.

8. The apparatus of claim 1, wherein the PUF cell is voltage-dependent and is a butterfly PUF cell or a SRAM PUF cell, and the one or more control signals effects a bias on a node connected to the PUF cell.

9. The apparatus of claim 1, wherein the PUF cell is delay-dependent and is an arbiter PUF cell or a ring oscillator PUF cell, and the one or more control signals effects a delay bias on a node connected to the PUF cell.

10. The apparatus of claim 1, further comprising a plurality of PUF cells including the PUF cell, wherein the selector circuit selects a subset of PUF cells by selecting a predetermined number of PUF cells in the plurality of PUF cells that are more stable than a remainder of the PUF cells in the plurality of PUF cells.

11. The apparatus of claim 1, wherein the PUF cell is unstable when the output of the PUF cell changes in response to the application of the one or more control signals to the PUF cell, and the PUF cell is stable when the output of the PUF cell is unchanged in response to the application of the one or more control signals to the PUF cell.

12. A circuit, comprising:
   a control circuitry configured to apply one or more control signals to a physically unclonable function (PUF) cell, wherein a stability of the PUF cell is evaluated based on whether an output of the PUF cell changes in response to application of the one or more control signals to the PUF cell;
   wherein the control circuitry includes at least one capacitor coupling a node of the PUF cell and at least one of the one or more control signals.

13. The circuit of claim 12, further comprising a plurality of PUF cells including the PUF cell, wherein at least one of the one or more control signals is applied to each PUF cell in the plurality of PUF cells, and wherein the selector circuit selects a subset of the PUF cells in the plurality of PUF cells based on whether outputs of the PUF cells change in response to application of the at least one of the one or more control signals.

14. The circuit of claim 12, further comprising a polarity control circuit that selectively changes a polarity of at least one of the one or more control signals before the one or more control signals are applied to the PUF cell.

15. The circuit of claim 12, further comprising a plurality of PUF cells including the PUF cell, wherein a first PUF cell that has a changed output when at least one of the one or more control signals is applied to the first PUF cell is determined to be less stable than a second PUF cell that has an unchanged output when at least one of the one or more control signals is applied to the second PUF cell.

16. A method, comprising:
   applying one or more control signals to a physically unclonable function (PUF) cell; and determining whether the PUF cell has a changed output in response to the one or more control signals;
   wherein at least one capacitor couples a node of the PUF cell and at least one of the one or more control signals.

17. The method of claim 16, further comprising assessing a stability of the PUF cell based on whether the PUF cell has a changed output.

18. The method of claim 16, wherein the PUF cell is in a plurality of PUF cells, and at least one of the one or more control signals is applied to each PUF cell in the plurality of PUF cells, the method further comprising selecting a subset of the PUF cells in the plurality of PUF cells based on whether outputs of the PUF cells change in response to application of the at least one of the one or more control signals.

19. The method of claim 16, further comprising selectively changing a polarity at least one of the one or more control signals before the one or more control signals are applied to the PUF cell.

20. The method of claim 16, wherein the PUF cell is determined to be unstable when the output of the PUF cell changes in response to the one or more control signals, and the PUF cell is determined to be stable when the output of the PUF cell is unchanged in response to the one or more control signals.

* * * * *